United States Patent
Johnson et al.

(10) Patent No.: US 8,979,477 B2
(45) Date of Patent: Mar. 17, 2015

(54) SYSTEM FOR COOLING AND PURGING EXHAUST SECTION OF GAS TURBINE ENGINE

(75) Inventors: David Martin Johnson, Simpsonville, SC (US); Radu Ioan Danescu, Greer, SC (US); Srinivasarao Pakkala, Andhra Pradesh (IN); Piotr Edward Kobek, Warsaw (PL)

(73) Assignee: General Electric Company, Schenectady, NY (US)

(*) Notice: Subject to any disclaimer, the term of this patent is extended or adjusted under 35 U.S.C. 154(b) by 1043 days.

(21) Appl. No.: 13/044,491

(22) Filed: Mar. 9, 2011

(65) Prior Publication Data

US 2012/0227371 A1     Sep. 13, 2012

(51) Int. Cl.
| | | |
|---|---|---|
| *F01D 9/06* | (2006.01) | |
| *F01D 25/16* | (2006.01) | |
| *F01D 25/30* | (2006.01) | |

(52) U.S. Cl.
CPC .............. *F01D 9/065* (2013.01); *F01D 25/162* (2013.01); *F01D 25/30* (2013.01)
USPC ........................................................ 415/111

(58) Field of Classification Search
CPC .... F05D 2240/14; F01D 25/12; F01D 25/162
USPC ........... 60/39.5, 39.83, 806, 782, 785, 39.08, 60/770; 415/115, 142, 211.2, 220
See application file for complete search history.

(56) References Cited

U.S. PATENT DOCUMENTS

| | | | |
|---|---|---|---|
| 5,107,676 A * | 4/1992 | Hadaway et al. | 60/226.1 |
| 5,388,960 A * | 2/1995 | Suzuki et al. | 415/176 |
| 6,266,954 B1 | 7/2001 | McCallum et al. | |
| 6,438,938 B1 * | 8/2002 | Burkholder et al. | 60/39.08 |
| 7,766,610 B2 * | 8/2010 | Busekros et al. | 415/144 |
| 2002/0037217 A1 * | 3/2002 | Itzel et al. | 415/115 |
| 2008/0014083 A1 * | 1/2008 | Eleftheriou et al. | 415/213.1 |
| 2010/0054927 A1 * | 3/2010 | Almstedt et al. | 415/180 |

* cited by examiner

*Primary Examiner* — Nathaniel Wiehe
*Assistant Examiner* — Eldon Brockman
(74) *Attorney, Agent, or Firm* — Fletcher Yoder, P.C.

(57) ABSTRACT

A system is provided with a turbine exhaust strut configured to provide a bi-directional airflow. The turbine exhaust strut includes a first portion having a first flow passage configured to flow a fluid in a first direction between inner and outer exhaust walls of a turbine exhaust section, and a second portion having a second flow passage configured to flow the fluid in a second direction between the inner and outer exhaust walls of the turbine exhaust section. Furthermore, the first and second directions are opposite from one another.

16 Claims, 6 Drawing Sheets

SYSTEM FOR COOLING AND PURGING EXHAUST SECTION OF GAS TURBINE ENGINE

BACKGROUND OF THE INVENTION

The subject matter disclosed herein relates to gas turbine cooling and more specifically to exhaust section cooling.

A gas turbine engine combusts a mixture of fuel and compressed air to generate hot combustion gases, which drive turbine blades to rotate. The rotation of the turbine blades causes rotation of a shaft supported by bearings. The rotation of the shaft and the hot combustion gases exiting through the turbine exhaust section may generate significant amounts of heat in the bearings and other exhaust section components. Unfortunately, this heat may cause damage to the turbine components, without adequate cooling in the exhaust section.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine exhaust strut configured to provide a bi-directional airflow. The turbine exhaust strut includes a first portion having a first flow passage configured to flow a fluid in a first direction between inner and outer exhaust walls of a turbine exhaust section, and a second portion having a second flow passage configured to flow the fluid in a second direction between the inner and outer exhaust walls of the turbine exhaust section. Furthermore, the first and second directions are opposite from one another.

In a second embodiment, a system includes a turbine exhaust section, including an exhaust flow path, an outer structure having an outer exhaust wall disposed along the exhaust flow path, an inner structure having an inner exhaust wall disposed along the exhaust flow path, and an inner cavity disposed between the inner exhaust wall and a rotational axis of a turbine, a bearing assembly disposed in the inner cavity, a lubrication passage disposed in the inner cavity, a strut extending between the outer structure and the inner structure, wherein the strut having a first flow passage configured to flow a fluid through the inner cavity.

In a third embodiment, a system includes a turbine section, and an exhaust section coupled to the turbine section, including an exhaust flow path, an outer structure having an outer exhaust wall disposed along the exhaust flow path, an outer casing, and an outer cavity disposed between the outer exhaust wall and the outer casing, an inner structure having an inner exhaust wall disposed along the exhaust flow path, and an inner cavity disposed between the inner exhaust wall and a rotational axis of a turbine, a first flow passage configured to flow a fluid through the inner cavity, and a second flow passage configured to flow the fluid from the inner cavity to the outer cavity.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed below, the disclosed embodiments enable cooling and purging of various components in an exhaust section of a gas turbine engine, e.g., bearings, struts, outer exhaust, inner structure, and so forth. For example, certain embodiments include a strut capable of bi-directional airflow that enables a single cooling air blower to cool the bearings, and other exhaust section components of the gas turbine engine. For example, the strut may include a plurality of separate flow passages. In some embodiments, a first passage of the strut may flow a cooling fluid (e.g., air) from the outer exhaust wall to the inner structure containing the bearings while a second passage may flow the cooling fluid from the inner structure to the outer exhaust wall after cooling the bearings and other exhaust section components. Thus, the first and second passages flow the cooling fluid in opposite directions, while controlling heat in the strut, the inner structure, and an outer structure having the outer exhaust wall. For example, the cooling fluid may transfer heat away from (e.g., cool) the bearings, inner exhaust wall, and aft portion of the inner structure, while adjusting a temperature of the outer structure (e.g., outer exhaust wall) via a combination of the relatively lower temperature cooling fluid entering the first passage and the relatively higher temperature cooling fluid exiting the second passage. In some embodiments, the cooling fluid may vent into the exhaust flow from the inner structure of the outer structure. Furthermore, a variety of insets may be selectively mounted in openings in the inner or outer structure to control an amount of venting. For example, some of the inserts may completely block airflow, while others reduce the amount of airflow into the exhaust flow.

Figure 1:
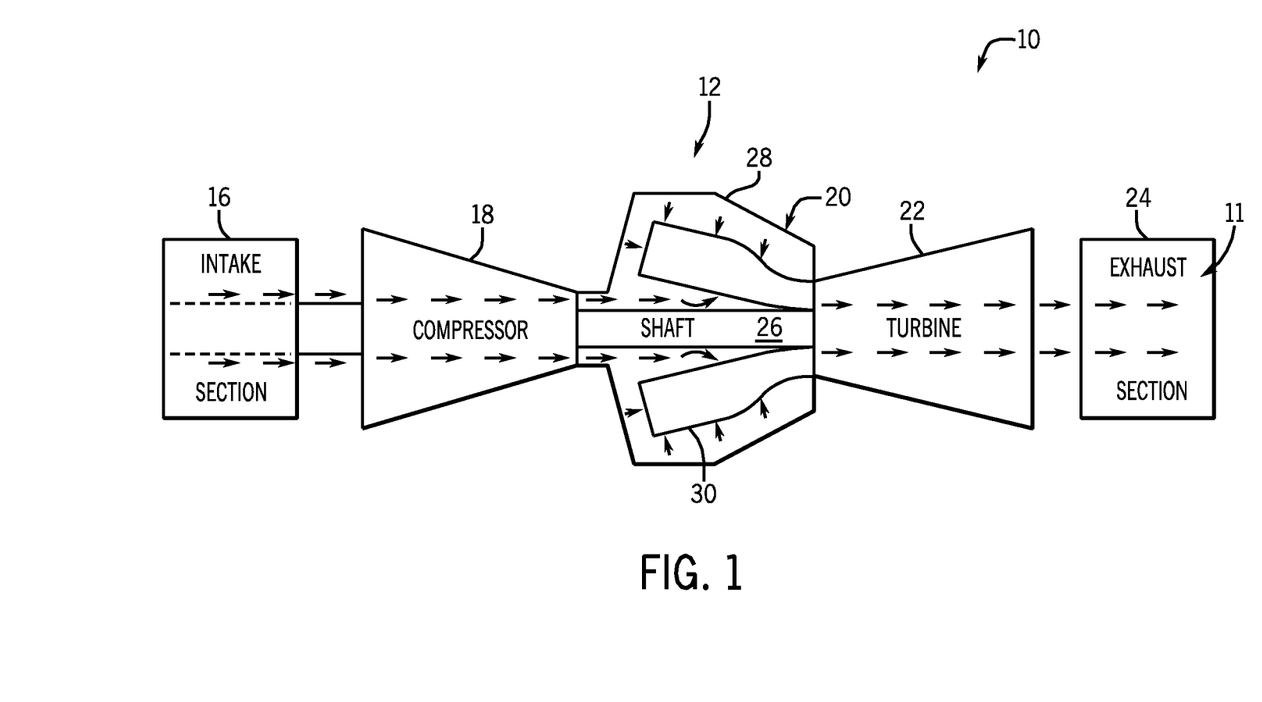
FIG. 1 is a schematic flow diagram of an embodiment of a gas turbine engine that may employ exhaust section cooling.

FIG. 1 is a schematic flow diagram of an embodiment of a turbine system 10 having a gas turbine engine 12 that may employ bi-directional exhaust section cooling. For example, the system 10 may include a multi-directional cooling system 11 having a plurality of separate flow rates in an exhaust section strut. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26. As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30, where the compressed air may mix and combust with fuel within the combustors 30 to drive the turbine 22. From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24. As discussed below, the exhaust section 24 may include a plurality of struts, each having multiple flow paths of the multi-directional cooling system 11.

Figure 2:
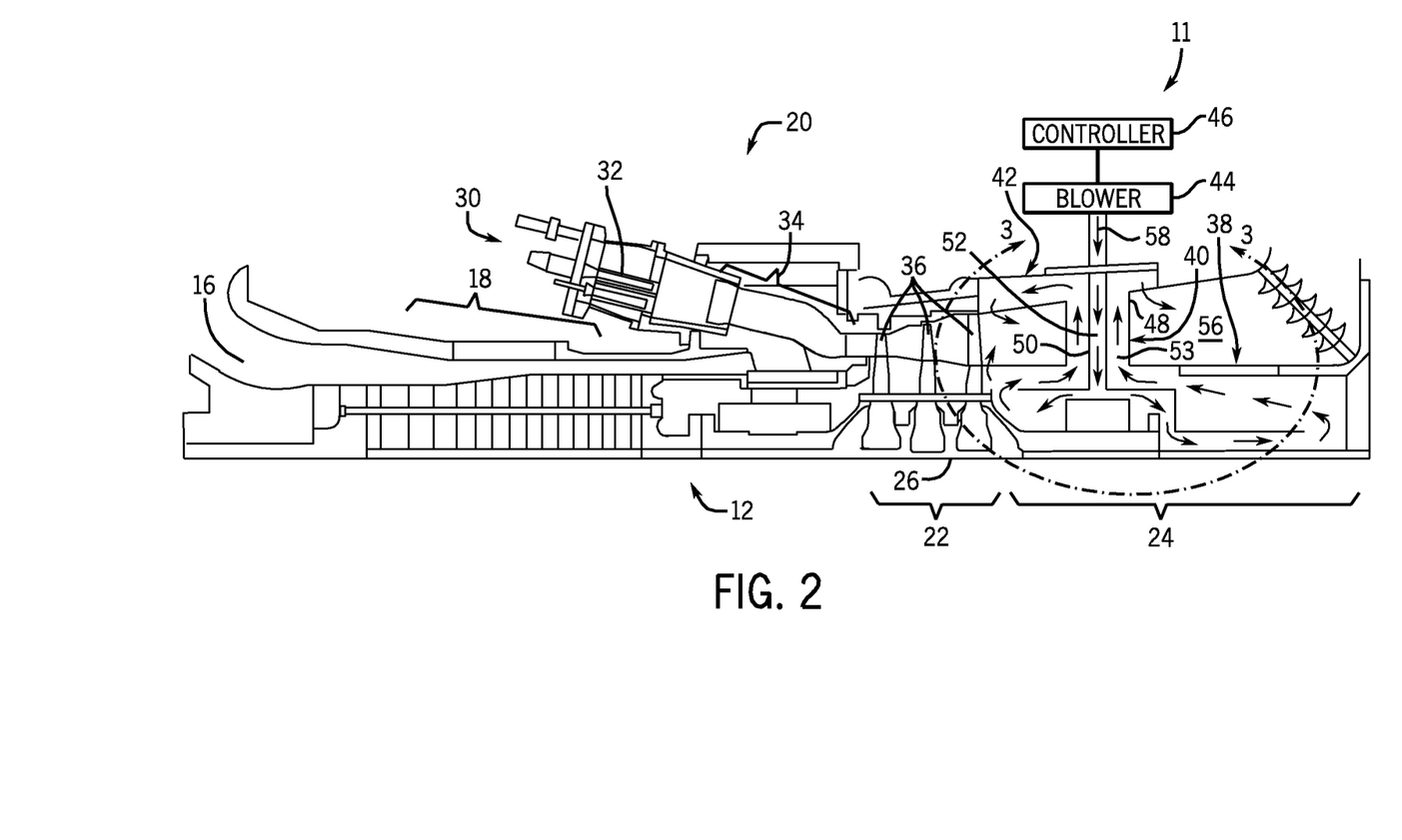
FIG. 2 is a sectional view of an embodiment of the gas turbine engine of FIG. 1 sectioned through the longitudinal axis, illustrating a multi-directional cooling system.

FIG. 2 is a sectional view of an embodiment of the gas turbine engine 12 of FIG. 1 sectioned through the longitudinal axis, illustrating an embodiment of the multi-directional cooling system 11. As described above with respect to FIG. 1, air may enter the gas turbine engine 12 through the air intake section 16 and may be compressed by the compressor 18. The compressed air from the compressor 18 may then be directed into the combustor section 20 where the compressed air may be mixed with fuel. The combustion section 20 includes one or more combustors 30. In certain embodiments, the gas turbine engine 12 may include multiple combustors 30 disposed in an annular arrangement. Further, each combustor 30 may include multiple fuel nozzles 32 attached to or near the head end of each combustor 30 in an annular or other arrangement. In operation, the fuel nozzles 32 may inject a fuel-air mixture into the combustors 30 in a suitable ratio for optimal combustion, emissions, fuel consumption, and power output.

Within the combustion section 20, the fuel-air mixture may combust to generate hot, pressurized combustion gases. After combustion, the hot pressurized combustion gases may exit the combustor section 20 and flow through a transition piece 34 to the turbine 22. Within the turbine 22, the pressurized combustion gases may turn blades 36 that extend radially within the turbine 22 to rotate the shaft 26 before exiting through the exhaust section 24 as exhaust gas.

The exhaust section 24 may include an inner structure 38, at least one strut 40, and an outer structure 42. The strut 40 provides the support between the outer structure 42 and the inner structure 38. As the hot combustion gases exit the turbine 22 and shaft 26 rotates, the components in exhaust section 24 may experience high temperature conditions. More specifically, the high temperature conditions may cause thermal stress, wear, and/or damage to the strut 40, the inner structure 38, and the outer structure 42. Accordingly, the multi-directional cooling system 11 includes a blower 44 coupled to a controller 46, which controls a cooling air flow through the inner structure 38, the strut 40, and the outer structure 42 to reduce thermal stress and wear of these components and parts disposed therein.

In the illustrated embodiment, the strut 40 defines an outer body 48 and an inner body 50. As illustrated, the inner body 50 defines a first flow passage 52 (e.g., inner flow passage) and the outer body 48 defines a second flow passage 53 (e.g., outer flow passage) of the multi-directional cooling system 11. As discussed below, the flow passages 52 and 53 are separate from one another to enable bi-directional flow of a cooling fluid (e.g., air) through the strut 40. Although the illustrated strut 40 includes only two separate passages 52 and 53, the strut 40 may include any number of separate passages to route a cooling fluid (e.g., air) to and from various features in the inner structure 38, the outer structure 42, and the strut 40. As illustrated, the blower 44 under the control of controller 46 blows cooling air 58 through the outer structure 42, through the strut 40 (i.e., passage 52 of inner body 50), and into the inner structure 38. The cooling air 58 circulates in the inner structure 38 and then exits through the outer body 48 of the strut 40. After flowing through the strut 40 to and from the inner structure 38, the cooling air 58 flows into the outer structure 42 for venting into the exhaust flow path 56. As discussed in detail below, multi-directional cooling system 11 enables a single blower 44 to cool the strut 40, while simultaneously purging heat from the inner structure 38.

Furthermore, in certain embodiments, the inner body 50 of the strut 40 is a load bearing structural support configured to bear a considerable mechanical load between the inner and outer structures 38 and 42 of the of the exhaust section 24, while the outer body 48 of the strut 40 is not a load bearing structural support. For example, the outer body 48 may be included to protect the inner body 50 by blocking heat from the inner body 50. In particular, the outer body 48 may be designed to flow cooling air externally along the inner body 50 to provide a thermal barrier between the inner body 50 and the hot combustion gases in the exhaust section 24. The outer body 48 also may have greater thermal resistance to the hot combustion gases as compared with the inner body 50. For example, the inner body 50 may have a lower temperature limit than the outer body 48. In some embodiments, the inner body 50 may have a temperature limit lower than the temperature of the hot combustion gases, while the outer body 48 may have a temperature limit substantially above the temperature of the hot combustion gases. Thus, the outer body 48 thermally protects the inner body 50, such that the inner body 50 is able to effectively bear the mechanical load between the inner and outer structures 38 and 42 of the exhaust section 24.

Figure 3:
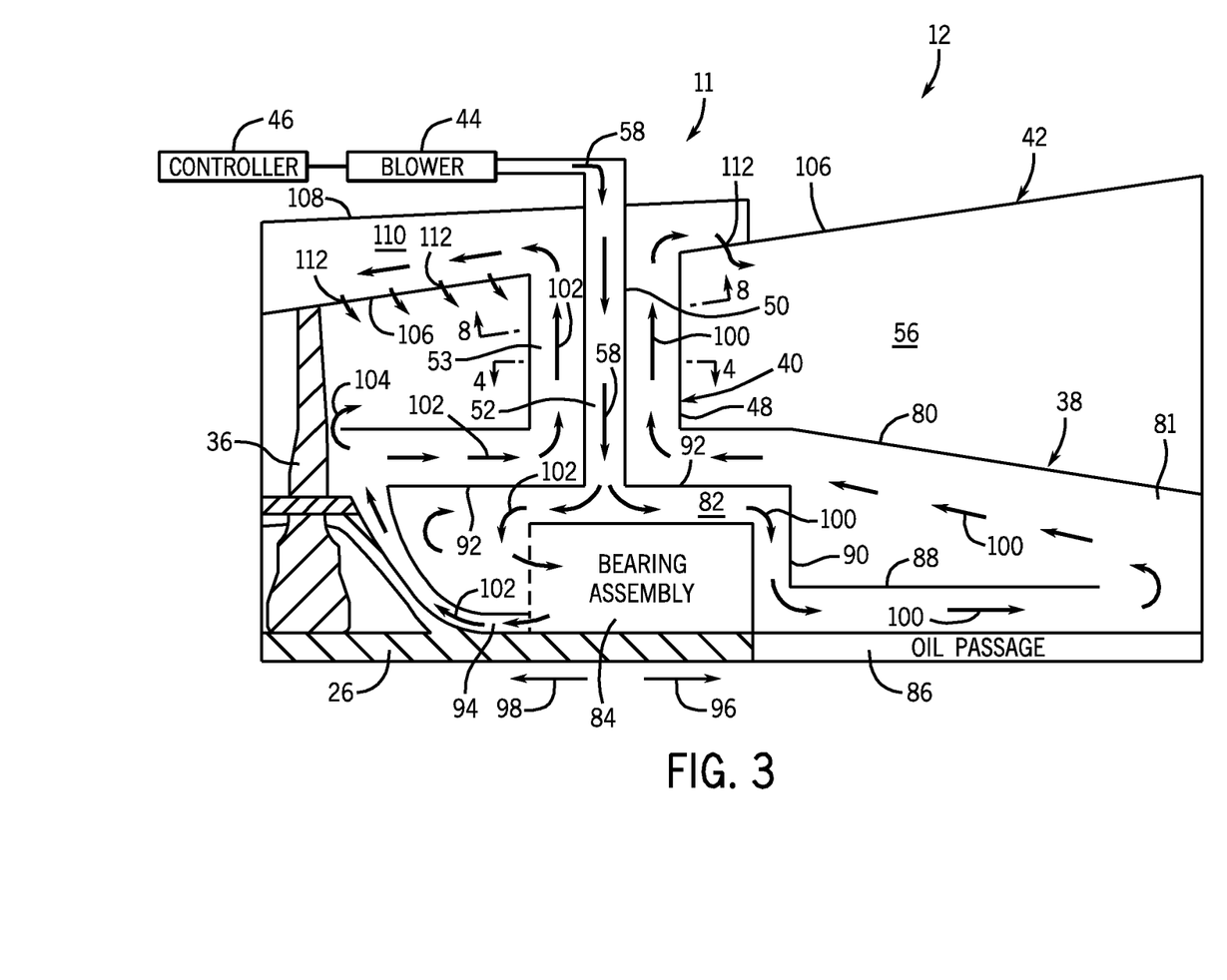
FIG. 3 is a sectional view of an embodiment of the gas turbine engine of FIG. 2 taken within line 3-3, illustrating exhaust section cooling by the multi-directional cooling system.

FIG. 3 is a sectional view of an embodiment of the gas turbine engine 12 of FIG. 2 taken within line 3-3, illustrating exhaust section cooling by the multi-directional cooling system 11. The design of the strut 40 enables a single blower 44 to cool the strut 40 and inner structure 38. As illustrated, the inner structure 38 defines an inner exhaust wall 80, a bearing cavity 82, bearing assembly 84, lubricant (e.g., oil) passage 86, baffle (e.g., sleeve) 88, baffle (e.g., disc) 90, bearing support wall 92, and aft shaft rotor cavity 94. As explained above, the blower 44 blows cooling air through the inner body 50 of the strut 40. The cooling air convectively cools the passage 52 in the inner body 50, thus reducing the possibility of damage associated with thermal stress in the strut 40.

After passing through the strut 40, the cooling air 58 enters the inner structure 38. More specifically, the cooling air 58 passes through the bearing support wall 92 and into the bearing cavity 82, where it cools the bearing assembly 84. The bearing assembly 84 generates significant amounts of heat as its bearings spin during rotation of shaft 26. Accordingly, the cooling airflow convectively cools the bearing assembly 84 to reduce premature wear or damage caused by the heat.

After contacting the bearing assembly 84, the cooling air 58 separates into two airflows 100 and 102 in opposite axial directions as indicated by arrows 96 and 98. The airflow 100 traveling in axial direction 96 contacts baffle (e.g., disc) 90, which directs the airflow 100 radially toward the baffle (e.g., sleeve) 88. The sleeve 88 routes the airflow 100 axially along the lubricant passage 86. As illustrated, the baffles 88 and 90 focus and restrict (e.g., funnel) the airflow 100 along the lubricant passage 86, thereby enhancing the convective cooling of the lubricant passage 86. Upon exiting the sleeve 88, the airflow 100 passes along the inner exhaust wall 80 at a downstream end portion 81 of the inner structure 38, thereby cooling the downstream end portion 81. Again, the baffles 88 and 90 may force the airflow to pass along the inner exhaust wall 80, thereby enhancing convective cooling of the wall 80. Upon reaching the strut 40, the airflow 100 then travels through the passage 53 of the outer body 48 and into the outer structure 42.

Unlike the airflow 100, the airflow 102 travels in the opposite axial direction of arrow 98. While traveling in the direction of arrow 98, the airflow 102 passes through the bearing assembly 84 and then enters the turbine aft wheel space 94. The airflow 102 then travels toward the inner exhaust wall 80, where part of it exits through gap 104 into the exhaust path 56. The rest of the airflow 102 returns to the strut 40, where it enters the outer body 48 and travels in the passage 53 to the outer structure 42.

The outer structure 42 includes an outer exhaust wall 106 and an outer casing 108, which define an intermediate outer cavity 110 (e.g., annular space). As the air 100 and 102 exits the strut 40, it enters the outer cavity 110 for controlling the temperature of the outer structure 42 before venting into the exhaust flow path 56. For example, the air 100 and 102 vents into the exhaust flow path 56 through apertures 112 in the outer exhaust wall 106. In some embodiments, the inner exhaust wall 80 may also include apertures 112 for venting the airflow into the exhaust flow path 56. As illustrated, the outer structure 42 includes both a cooled airflow 58 and a warmed airflow 100 and 102, which are separated from one another. These two airflows may be adjusted to control the temperature in the outer structure 42. For example, the ratio of these two airflows may be adjusted by varying the sizes of the passages 52 and 53, the number and sizes of the apertures 112 in the inner and outer exhaust walls 80 and 106 and so forth.

Figure 4:
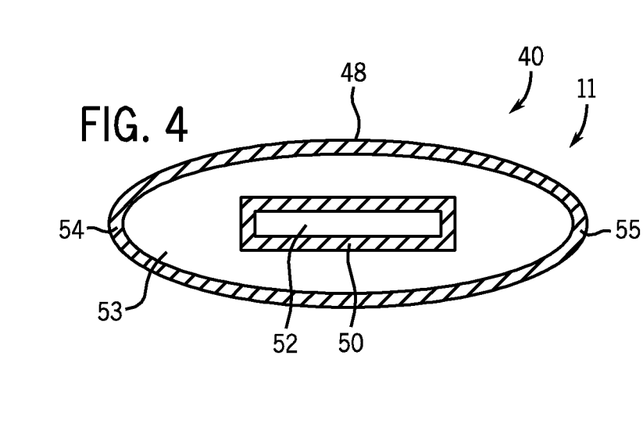
FIG. 4 is a cross-sectional view of an embodiment of the strut in FIG. 3 taken along line 4-4.

FIG. 4 is a cross-sectional view of an embodiment of the strut 40 in FIG. 3 taken along line 4-4. As described above, the strut 40 includes the outer body 48 disposed about the inner body 50. As illustrated, the outer body 48 defines the passage 53, leading edge 54, and trailing edge 55, while the inner body 48 includes the passage 52. In the present embodiment, the outer body 48 has an oval shape (e.g., an airfoil shape), while the inner body 50 has a rectangular shape. In other embodiments, the inner and outer bodies 48 and 50 may have other shapes, such as rectangular in rectangular, airfoil in airfoil, oval in oval, and so forth. Despite the shapes, the inner and outer bodies 48 and 50 are disposed one inside another, such that the passages 52 and 53 are isolated one inside another (e.g., coaxial). The two passages 52 and 54 provide bi-directional airflow between the inner and outer structures 38 and 42. For example, the passage 52 may direct the airflow inwardly from the outer structure 42 to the inner structure 38 while the passage 53 directs the airflow from the inner structure 38 to the outer structure 42, or vice versa. However, an embodiment with cooler airflow in the passage 52 and warmer air in the passage 53 may reduce a temperature differential between the outer body 48 of the strut 40 and the exhaust gas in the exhaust portion 56, thereby reducing thermal stress in the strut 40. In some embodiments, each passage 52 and 53 may be configured to route air to a specific region of the inner structure 38. In either embodiment, the passages 52 and 53 in the strut 40 enable a single blower 44 to cool the strut 40, the inner structure 38, and the outer structure 42. In the inner structure 38, the airflow can be directed to various regions to enhance convective cooling before being vented into the exhaust.

Figure 5:
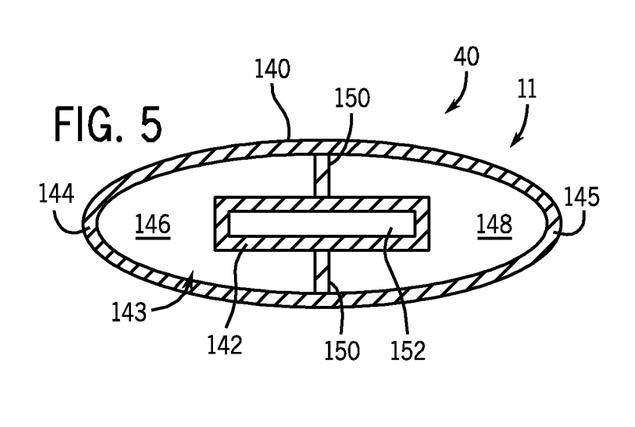
FIG. 5 is a cross-sectional view of an embodiment of the strut in FIG. 3 taken along line 4-4.

FIG. 5 is a cross-sectional view of an embodiment of the strut 40 in FIG. 3 taken along line 4-4. The strut 40 defines an outer body 140 disposed about an inner body 142 (e.g., coaxial). The outer body 140 defines a passage 143, a leading edge 144, and a trailing edge 145. The outer body 140 may form any number of shapes, such as oval, airfoil, teardrop, rectangular, square, circular, or generally elongated. The outer body 140 receives the inner body 142, which is sized smaller than the outer body 140 to define one passage 143. As illustrated, the passage 143 is subdivided by walls 150 to form passages 146 and 148. In other embodiments, the passage 143 may be further subdivided by walls 150 to define any number of passages (e.g., 1, 2, 3, 4, 5, 6, 7, 8, 9, 10, or more passages). Similar to the outer body 140, the inner body 142 may form any number of shapes, such as oval, airfoil, teardrop, rectangular, square, circular, or generally elongated. Although the illustrated inner body 142 includes a single passage 152, the inner body 142 may include any number of passages (e.g., 1, 2, 3, 4, 5, 6, 7, 8, 9, 10, or more passages). As discussed above, the passages 146, 148, and 152 enable a single blower 44 to blow cooling air that cools the strut 40 and inner structure 38, while simultaneously purging the inner structure 38 of warmed air. Furthermore, the multiple passages may enable dedicated coolant flows (e.g., air flows) to and/or from specific regions of the inner structure 38 of the exhaust section 24. For example, dedicated airflows may be routed to/from the bearing assembly 84, the downstream end portion 81 of the inner structure 38, or the turbine aft wheel space 94.

Figure 6:
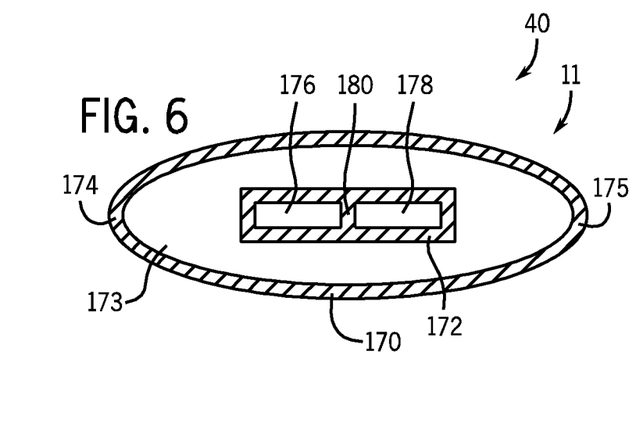
FIG. 6 is a cross-sectional view of an embodiment of the strut in FIG. 3 taken along line 4-4.

FIG. 6 is a cross-sectional view of an embodiment of the strut 40 in FIG. 3 taken along line 4-4. The strut 40 defines an outer body 170 disposed about an inner body 172. The outer body 170 defines a passage 173, leading edge 174, and trailing edge 175. The outer body 170 may form any number of shapes including oval, airfoil, teardrop, rectangular, square, circular, or generally elongated, and includes a passage 173. The outer body 170 receives the inner body 172 within the passage 173. As illustrated, the inner body 172 defines two passages 176 and 178 separated by a wall 180. In other embodiments, more walls 180 may form additional passages in inner body 172, (e.g., 1, 2, 3, 4, 5, 6, 7, 8, 9, 10 or more passages). Similar to the outer body 170, the inner body 172 may form any number of shapes, such as oval, airfoil, teardrop, rectangular, square, circular, or generally elongated. As discussed above, the passages 174, 176, and 178 enable a single blower to blow cooling air that cools the strut 40 and inner structure 38 while simultaneously purging the inner structure 38 of the warmed air. Furthermore, the multiple passages may enable dedicated coolant flows (e.g., airflows) to and/or from specific regions of the inner structure 38 of the exhaust section 24. For example, dedicated airflows may be routed to/from the bearing assembly 84, the downstream end portion 81 of the inner structure 38, or the turbine aft wheel space 94.

Figure 7:
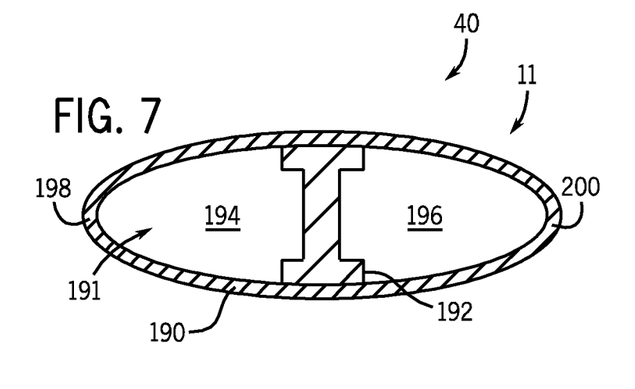
FIG. 7 is a cross-sectional view of an embodiment of the strut in FIG. 3 taken along line 4-4.

FIG. 7 is a cross-sectional view of an embodiment of the strut 40 in FIG. 3 taken along line 4-4. The strut 40 includes an outer body 190, a hollow interior 191, and an interior support beam 192 (e.g., an I-beam). The outer body 190 may form any number of shapes, such as oval, airfoil, teardrop, rectangular, square, circular, or generally elongated. The support beam 192 divides the outer body 190 into two passages 194 and 196. In other embodiments, a plurality of support beams 192 may divide the outer body 190 into any number of passages (e.g., 1, 2, 3, 4, 5, 6, 7, 8, 9, 10 or more passages). The outer body 190 may also include a leading edge 198 and a trailing edge 200. The passages 194 and 196 enable a single blower 44 to blow cooling air that cools the strut 40 and inner structure 38, while simultaneously purging the inner structure 38 of the warmed air. More specifically, the cooling air may cool the strut 40 and inner structure 38 by passing through the passage 194 or 196 into the inner structure 38. After cooling the inner structure 38, the air may then be purged through the opposite passage 194 or 196. In certain embodiments, the cool supply airflow may be directed through the passage 194 along the leading edge 198, while the warmed return (purge) airflow may be directed through the passage 196 along the trailing edge 200. In this manner, the cooler supply airflow is focused on the hotter leading edge 198 of the strut 140 to improve the cooling and temperature distribution in the strut 40.

Figure 8:
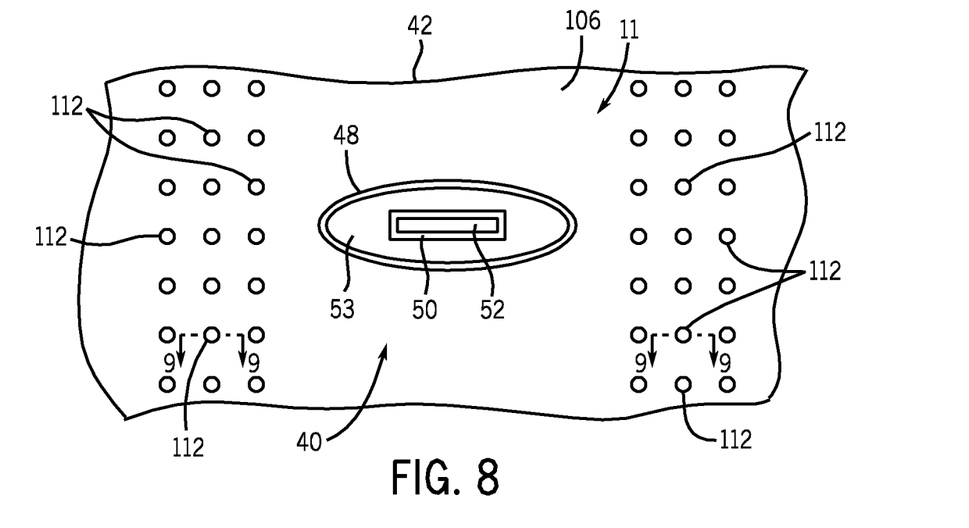
FIG. 8 is a sectional view of the strut and outer exhaust wall in FIG. 3 taken along line 8-8.

FIG. 8 is a sectional view of the strut 40 and outer exhaust wall 106 illustrating venting apertures 112 taken along line 8-8 of FIG. 3. As explained above, the cooling air is purged from the inner structure 38, where it flows through the passage 53 in the strut 40 to the outer structure 42 having the wall 106. In the outer structure 42, the airflow passes through the outer cavity 110 and then vents into the exhaust flow path 56 via apertures 112. As illustrated, the apertures 112 are circular in shape and arranged into rows. In other embodiments, the apertures 112 may form different shapes (e.g., square, triangular, rectangular, oval, elongated, polygonal, or cross-shaped), and may be arranged into other patterns (e.g., staggered, circular, rectangular, or random). Furthermore, the sizes of the apertures 112 may change depending on their location. For example, the apertures 112 may progressively change (e.g., increase or decrease) in diameter with distance from the strut 40. In some embodiments, the apertures 112 may be arranged in groups (e.g., 1 to 100 apertures 112) that are spaced apart from one another. Furthermore, the apertures 112 may be arranged between approximately 0 to 180 degrees relative to a rotational axis of the turbine engine 12. For example, the apertures 112 may be angled at 15, 30, 45, 60, 75, 90, 105, 120, 135, 150, or 165 degrees relative to the axis.

Figure 9:
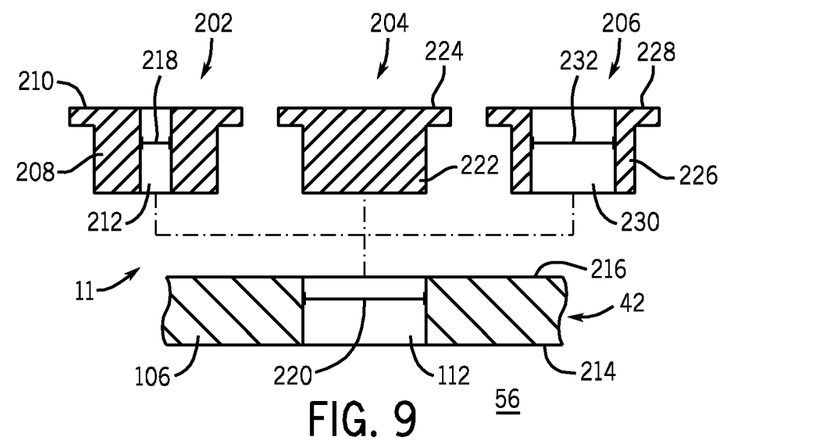
FIG. 9 is a cross-sectional view of an embodiment of removable inserts that may be inserted into an aperture of the outer exhaust wall in FIG. 8 taken along line 9-9.

FIG. 9 is a cross-sectional view of removable inserts 202, 204, and 206 that may be inserted into one or more apertures 112 of FIG. 8 as indicated by line 9-9. As illustrated, each aperture 112 may selectively receive a variety of inserts, such as inserts 202, 204, and 206. The inserts 202, 204, and 206 may assist in controlling the amount of air entering the exhaust flow path 56 of FIG. 3 through the apertures 112 of the outer exhaust wall 106. For example, each insert may provide a different amount of restriction for the aperture 112. Thus, a variety of different inserts may be coupled to the apertures 112 to control a flow distribution through the wall 106, thereby controlling a temperature distribution in the wall 106.

As illustrated, the insert 202 includes a body portion 208, a ledge portion 210, and an aperture 212. The body portion 208 fits within the aperture 112, while the ledge portion 210 rests on the inner surface 214 or the outer surface 216 of the outer exhaust wall 106. The body portion 208 may be connected to the wall 106 by an (interference fit, threads, a weld, bolts, or another fastener). As illustrated, the aperture 212 defines a diameter 218 that is smaller than a diameter 220 of the aperture 112. Accordingly, upon insertion, the insert 202 will reduce the size of the aperture 112, which then limits the airflow into the exhaust flow path 56. Similar to the insert 202, the insert 204 includes a body portion 222 and a ledge portion 224. The body portion 222 fits within the aperture 220, while the ledge portion 224 contacts the inner surface 214 or outer surface 216 of the outer exhaust wall 106. As illustrated, the insert 204 does not include an aperture and therefore fills the entire aperture 112, thereby blocking cooling air from venting into the exhaust flow path 56. The insert 206 likewise includes a body portion 226, a ledge portion 228, and an aperture 230. The body portion 226 fits within the aperture 112, while the ledge 228 rests on the inner surface 214 or the outer surface 216 of the outer exhaust wall 106. As illustrated, the aperture 230 defines a diameter 232 that is smaller than the diameter 220 of the aperture 112, but larger than diameter 218 of insert 202. Accordingly, upon insertion, the insert 206 will reduce the size of the aperture 112, which then limits the airflow into the exhaust flow path 56 by an amount less than insert 202.

Although the illustrated embodiment includes only three inserts 202, 204, and 206 any number of inserts with varying restriction apertures may be employed in the turbine engine 12. These inserts 202, 204, and 206 control the amount and distribution of airflow through the wall 106 and into the exhaust flow path 56. For example, the inserts 202, 204, and 206 may be used in different apertures 112 to control the cooling of the outer structure 42 in a more uniform manner. As a result, the selective use of these inserts 202, 204, and 206 may reduce temperature gradients and thermal stress in the outer structure 42.

Figure 10:
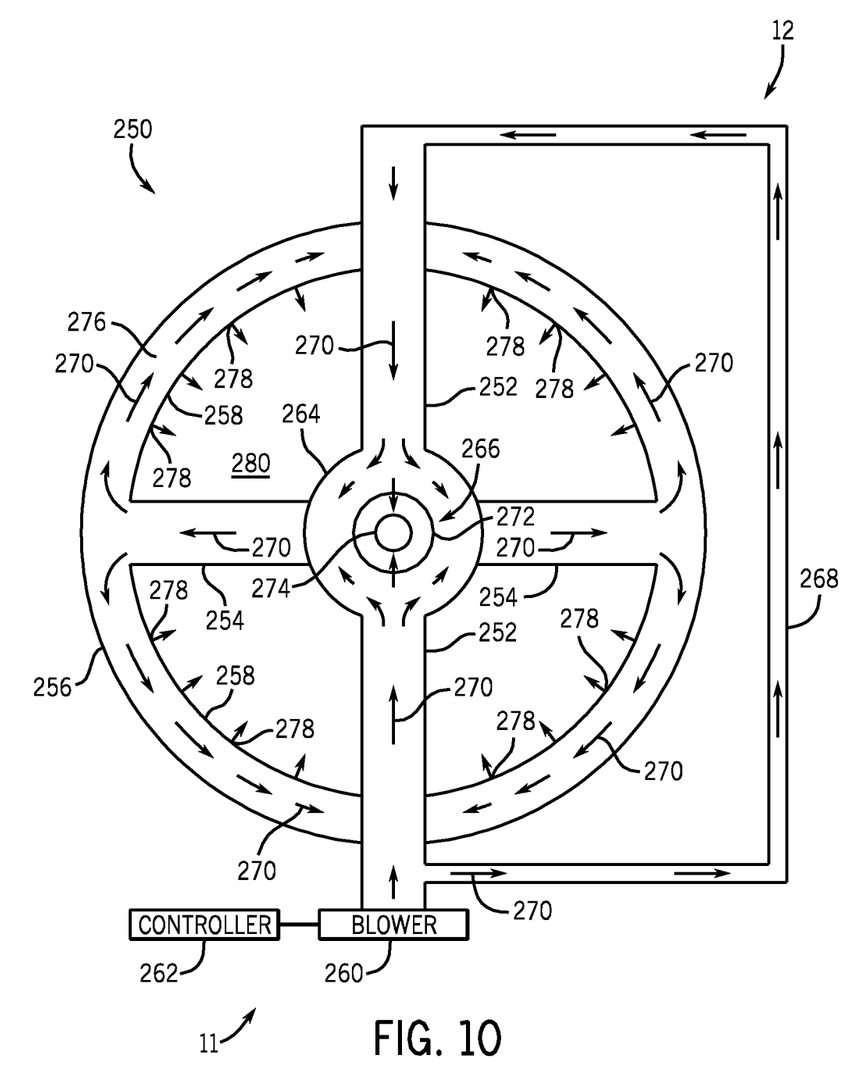
FIG. 10 is a front view of an embodiment of a turbine exhaust section employing exhaust section cooling.

FIG. 10 is a sectional front view of an exhaust section 250 with cooling struts 252 and 254 in the gas turbine engine 12. The exhaust section 250 includes cooling struts 252 and 254, outer casing 256, outer exhaust wall 258, blower 260, controller 262, inner structure 264, bearing assembly 266, and line 268. As illustrated, the controller 262 controls the blower 260 to blow cooling air 270 through the cooling struts 252. The cooling air 270 cools the struts 252 as it flows inwardly toward the inner structure 264. In the inner structure 264, the cooling air 270 cools the bearing assembly 266. For example, the cooling air 270 may flow through the bearing housing 272 to cool the bearings 274. After cooling the bearings 274, the air 270 then exits the inner structure 264 though the struts 254. The struts 254 route the air 270 into outer cavity 276 between the outer casing 256 and the outer exhaust wall 258. As the air 270 flows through the outer cavity 276, the air 270 may control the temperature (e.g., cool) the outer exhaust wall 258 and vent into the exhaust flow path 280 via apertures 278. As discussed above, inserts may be placed within the apertures 278 to control the amount and distribution of airflow exiting the outer cavity 276 into the exhaust flow path 280. Accordingly, the exhaust section 250 enables a single blower 262 to cool the inner bearings 274 and the struts 252 and 254.

Technical effects of the invention include the ability to cool multiple components of a turbine exhaust section with a single blower. In particular, the disclosed embodiments enable cooling of struts, bearings, and other portions of an inner structure of the turbine exhaust section with the single blower. For example, the struts may be configured with one or more passages to direct airflow both into and out of the inner structure to simultaneously cool the struts, the bearings, and so forth. In one embodiment, each strut includes at least two passages to direct airflows in opposite directions into and out of the inner structure. In another embodiment, one strut may include at least one passage to route air into the inner structure, while another strut may include at least one passage to direct air out of the inner structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbine exhaust strut configured to provide a bi-directional airflow, wherein the turbine exhaust strut comprises:
a first portion comprising an inner body having a first flow passage configured to flow a fluid in a first direction between inner and outer exhaust walls of a turbine exhaust section; and
a second portion comprising an outer body having a second flow passage configured to flow the fluid in a second direction between the inner and outer exhaust walls of the turbine exhaust section, wherein the first and second directions are opposite from one another and the outer body surrounds the inner body.

2. The system of claim 1, wherein the first flow direction is oriented from the outer exhaust wall to the inner exhaust wall, and the second flow direction is oriented from the inner exhaust wall to the outer exhaust wall.

3. The system of claim 1, wherein the first flow direction is oriented from the inner exhaust wall to the outer exhaust wall, and the second flow direction is oriented from the outer exhaust wall to the inner exhaust wall.

4. The system of claim 1, wherein the inner body comprises a third flow passage separated from the first flow passage, and the third flow passage is configured to flow the fluid in the first direction or the second direction.

5. The system of claim 1, wherein the outer body comprises a fourth flow passage separated from the second flow passage, and the fourth flow passage is configured to flow the fluid in the first direction or the second direction.

6. The system of claim 1, wherein the inner body comprises a load bearing structural support, and the outer body is non-load bearing.

7. The system of claim 1, wherein the first flow passage is configured to flow the fluid into a first cavity between the inner exhaust wall and the rotation axis, and the second flow passage is configured to flow the fluid from the first cavity to a second cavity between the outer exhaust wall and an outer casing of the turbine exhaust section.

8. The system of claim 7, comprising the turbine exhaust section having the inner exhaust wall, the outer exhaust wall, and the outer casing.

9. The system of claim 8, wherein the first cavity comprises a bearing assembly, a lubricant passage, or a combination thereof.

10. The system of claim 8, wherein the inner exhaust wall or the outer exhaust wall comprises a plurality of openings configured to flow the fluid into the exhaust flow path.

11. The system of claim 10, wherein each opening of the plurality of openings comprises a removable insert.

12. The system of claim 8, comprising a single blower configured to circulate the fluid through the first and second flow passages.

13. A system, comprising:
a turbine exhaust section, comprising:
an exhaust flow path;
an outer structure comprising an outer exhaust wall disposed along the exhaust flow path;
an inner structure comprising an inner exhaust wall disposed along the exhaust flow path, and an inner cavity disposed between the inner exhaust wall and a rotational axis of a turbine;
a bearing assembly disposed in the inner cavity;
a lubrication passage disposed in the inner cavity; and
a strut extending between the outer structure and the inner structure, wherein the strut comprises a first flow passage configured to flow a fluid through the inner cavity;
wherein the inner cavity comprises a first cavity portion disposed along the bearing assembly, a second cavity portion disposed along the lubrication passage, and a third cavity portion disposed along a downstream end portion of the inner structure.

14. The system of claim 13, comprising a first baffle disposed between the first cavity and the third cavity, and a second baffle disposed between the second cavity and the third cavity.

15. The system of claim 13, wherein the outer structure comprises an outer casing and an outer cavity disposed between the outer exhaust wall and the outer casing, and the strut comprises a second flow passage configured to flow the fluid from the inner cavity to the outer cavity.

16. A system, comprising:
a turbine section, and
an exhaust section coupled to the turbine section, comprising:
an exhaust flow path;
an outer structure comprising an outer exhaust wall disposed along the exhaust flow path, an outer casing, and an outer cavity disposed between the outer exhaust wall and the outer casing;
an inner structure comprising an inner exhaust wall disposed along the exhaust flow path, and an inner cavity disposed between the inner exhaust wall and a rotational axis of a turbine;
a strut extending between the inner and outer structures, comprising:
an inner body with a first flow passage configured to flow a fluid between the outer exhaust wall and the inner exhaust wall; and
an outer body with a second flow passage configured to flow the fluid between the outer exhaust wall and the inner exhaust wall, wherein the outer body surrounds the inner body.

* * * * *